US012762967B2

(12) United States Patent
Mehboob et al.

(10) Patent No.: US 12,762,967 B2
(45) Date of Patent: Oct. 13, 2026

(54) SYSTEMS AND METHODS FOR PROVIDING LANDING ASSISTANCE AT A NON-TOWERED AIRPORT

(71) Applicant: HONEYWELL INTERNATIONAL INC., Charlotte, NC (US)

(72) Inventors: Roshini Mehboob, Bangalore (IN); Naveen Venkatesh Prasad Nama, Bangalore (IN); Sanjib Maji, Bangalore (IN); Mohammed Ibrahim Mohideen, Bangalore (IN)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 96 days.

(21) Appl. No.: 18/797,758

(22) Filed: Aug. 8, 2024

(65) Prior Publication Data

US 2025/0363896 A1 Nov. 27, 2025

(30) Foreign Application Priority Data

May 27, 2024 (IN) ............................ 202411041000

(51) Int. Cl.
*G08G 5/54* (2025.01)
*G08G 5/72* (2025.01)

(52) U.S. Cl.
CPC ............... *G08G 5/54* (2025.01); *G08G 5/723* (2025.01)

(58) Field of Classification Search
None
See application file for complete search history.

(56) References Cited

U.S. PATENT DOCUMENTS 6,552,669 B2 4/2003 Simon et al.
6,950,037 B1 * 9/2005 Clavier .................. G08G 5/727 342/36
7,385,527 B1 6/2008 Clavier et al.
7,868,812 B2 1/2011 Huthoefer et al.
8,108,087 B2 * 1/2012 Stone ....................... G08G 5/25 701/16
11,170,653 B2 11/2021 Wartofsky
11,423,787 B1 8/2022 Herbst
(Continued)

OTHER PUBLICATIONS

Traffic Management Automation for Non-Towered Airports (Year: 2005).*
(Continued)

*Primary Examiner* — Ryan Rink
(74) *Attorney, Agent, or Firm* — Ingrassia, Fisher & Lorenz LLP

(57) ABSTRACT

Systems and methods are provided for providing landing assistance at a non-towered airport onboard an aircraft. Traffic data associated with an intruder aircraft is received via a common traffic advisory frequency (CTAF). The traffic data includes a position of the intruder aircraft. An aircraft position of the aircraft is received from a geospatial sensor system of the aircraft. A determination is made regarding whether the position of the intruder aircraft is within a pre-defined distance of the non-towered airport. A landing assistance display including a graphical representation of a traffic pattern, the aircraft position of the aircraft, and the position of the first intruder aircraft with respect to the traffic pattern is generated for display on a display device onboard the aircraft based on the determination.

20 Claims, 4 Drawing Sheets

(56) References Cited

U.S. PATENT DOCUMENTS

| | | | | |
|---|---|---|---|---|
| 11,498,697 | B2 | 11/2022 | Tellechea et al. | |
| 11,787,560 | B2 | 10/2023 | Tellechea et al. | |
| 2003/0083804 | A1* | 5/2003 | Pilley | G01S 5/0009 342/36 |
| 2007/0061055 | A1* | 3/2007 | Stone | G01S 13/933 701/2 |
| 2018/0075757 | A1* | 3/2018 | Estes | G08G 5/32 |
| 2022/0106037 | A1* | 4/2022 | Padera | G08G 5/34 |
| 2024/0265814 | A1* | 8/2024 | Gettler, Jr. | G08G 5/22 |

OTHER PUBLICATIONS

FAA handbook.*

XP013195827; "System and method to assist the pilot in planning visual approach in the non-towered airfield ED—Darl Kuhn", ip.com, ip.com Inc., West Henrietta, NY, US, Apr. 7, 2023 (Apr. 7, 2023), ISSN: 1533-0001.

XP013185104; "Cockpit Information Query and Retrieval System ED—Darl Kuhn", ip.com, ip.com Inc., West Henrietta, NY, US, Dec. 6, 2019 (Dec. 6, 2019), ISSN: 1533-0001.

XP007917828; "Collision Avoidance Strategies and Tactics", Aug. 1, 2004, Aug. 1, 2004 (Aug. 1, 2004), pp. 1-16, Retrieved from the Internet: URL:http://www.aopa.org/asf/publications/sa15.pdf [retrieved on Mar. 21, 2011].

Mohideen, Mohammed Ibrahim, et al., System and Method to Assist the Pilot in Visual Approach in the Non-Towered Airfield, IP.com No. IPCOM000272093D, Apr. 7, 2023.

* cited by examiner

SYSTEMS AND METHODS FOR PROVIDING LANDING ASSISTANCE AT A NON-TOWERED AIRPORT

CROSS REFERENCE TO RELATED APPLICATION

This application claims priority to India Provisional Patent Application No. 202411041000, filed May 27, 2024, the entire content of which is incorporated by reference herein.

TECHNICAL FIELD

The present invention generally relates to aircraft operations and more particularly relates to systems and methods for providing landing assistance at a non-towered airport.

BACKGROUND

When an aircraft is approaching a non-towered airport to land, the pilot of the aircraft will typically begin monitoring a common traffic advisory frequency (CTAF) and broadcast an intention to land at the airport on CTAF. The pilot may execute a straight-in approach landing when other aircraft are not present at a non-towered airport. However, when other aircraft are present, the pilot will typically enter a traffic pattern associated with a runway at the non-towered airport in preparation for landing.

The pilot typically relies on communications broadcast by other aircraft over the CTAF to sequence entry into the traffic pattern and maintain safe flying distances with respect to the other aircraft. Examples of communications broadcast by the pilot of other aircraft include, an aircraft identifier, an aircraft position, an aircraft type, and an aircraft intention. In addition to monitoring communications broadcast by the pilot of other aircraft on the CTAF, the pilot may have to look out a cockpit window to continuously correlate the position of the other aircraft in the traffic pattern creating an additional workload for the pilot.

Hence, there is a need for systems and methods for providing landing assistance at a non-towered airport.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method of providing landing assistance associated with a non-towered airport onboard an aircraft includes: receiving first traffic data associated with a first intruder aircraft via a common traffic advisory frequency (CTAF), the first traffic data including a first position of the first intruder aircraft; receiving an aircraft position of the aircraft from a geospatial sensor system of the aircraft; determining whether the first position of the first intruder aircraft is within a pre-defined distance of the non-towered airport; and generating a landing assistance display including a graphical representation of a traffic pattern, the aircraft position of the aircraft, and the first position of the first intruder aircraft with respect to the traffic pattern for display on a display device onboard the aircraft based on the determination.

A system for providing landing assistance associated with a non-towered airport onboard an aircraft including at least one processor and at least one memory communicatively coupled to the at least one processor. The at least one memory includes instructions that, upon execution by the at least one processor, cause the at least one processor to: receive first traffic data associated with a first intruder aircraft via a common traffic advisory frequency (CTAF), the first traffic data including a first position of the first intruder aircraft; receive an aircraft position of the aircraft from a geospatial sensor system of the aircraft; determine whether the first position of the first intruder aircraft is within a pre-defined distance of the non-towered airport; and generate a landing assistance display including a graphical representation of a traffic pattern, the aircraft position of the aircraft, and the first position of the first intruder aircraft with respect to the traffic pattern for display on a display device onboard the aircraft based on the determination.

A non-transitory machine-readable storage medium that stores instructions executable by at least one processor, the instructions configurable to cause the at least one processor to perform operations including: receiving first traffic data associated with a first intruder aircraft via a common traffic advisory frequency (CTAF), the first traffic data including a first position of the first intruder aircraft; receiving an aircraft position of the aircraft from a geospatial sensor system of the aircraft; determining whether the first position of the first intruder aircraft is within a pre-defined distance of a non-towered airport; and generating a landing assistance display including a graphical representation of a traffic pattern, the aircraft position of the aircraft, and the first position of the first intruder aircraft with respect to the traffic pattern for display on a display device onboard the aircraft based on the determination.

Furthermore, other desirable features and characteristics of the systems and methods for providing interactive emergency landing assistance become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature. As used herein, the word “exemplary” means “serving as an example, instance, or illustration.” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
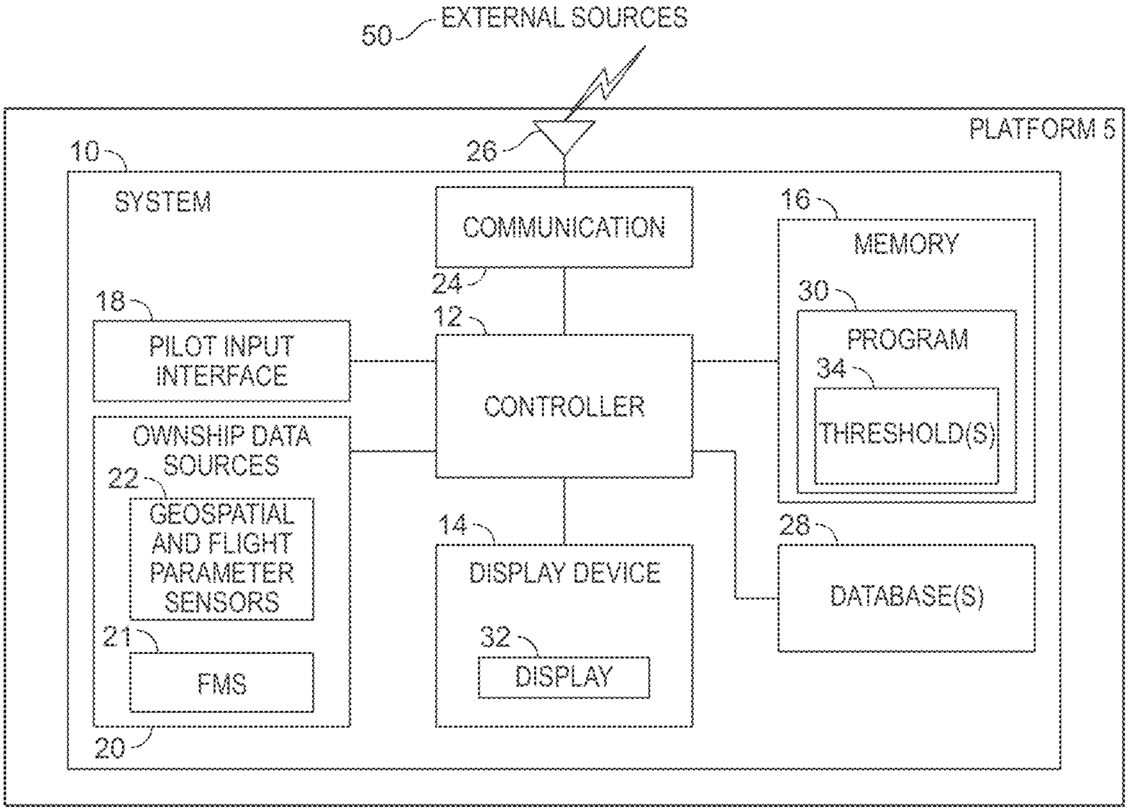
FIG. 1 is a block diagram representation of a system configured to provide landing assistance at a non-towered airport in accordance with least one embodiment.

FIG. 1 is a block diagram representation of a system 10 configured to provide landing assistance at a non-towered airport in accordance with least one embodiment (shortened herein to "system" 10), as illustrated in accordance with an exemplary and non-limiting embodiment of the present disclosure. The system 10 may be utilized onboard a mobile platform 5, as described herein. In various embodiments, the mobile platform is an aircraft, which carries or is equipped with the system 10. As schematically depicted in FIG. 1, the system 10 may include one or more of the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system state and geospatial sensors 22.

In various embodiments, the system 10 may be separate from or integrated within: the flight management system (FMS) 21 and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the mobile platform 5.

The term "controller circuit" (and its simplification, "controller"), broadly encompasses those components utilized to carry-out or otherwise support the processing functionalities of the system 10. Accordingly, the controller circuit 12 can encompass or may be associated with a programmable logic array, application specific integrated circuit or other similar firmware, as well as any number of individual processors, flight control computers, navigational equipment pieces, computer-readable memories (including or in addition to the memory 16), power supplies, storage devices, interface cards, and other standardized components. In various embodiments, the controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program, for example, a program 30, that embodies an algorithm described herein for providing landing assistance at a non-towered airport in accordance with least one embodiment on a mobile platform 5, where the mobile platform 5 is an aircraft, and to accordingly perform the various process steps, tasks, calculations, and control/display functions described herein.

The controller circuit 12 may exchange data, including real-time wireless data, with one or more external sources 50 to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

The memory 16 is a data storage that can encompass any number and type of storage media suitable for storing computer-readable code or instructions, such as the aforementioned software program 30, as well as other data generally supporting the operation of the system 10. The memory 16 may also store one or more threshold 34 values, for use by an algorithm embodied in software program 30. One or more database(s) 28 are another form of storage media; they may be integrated with memory 16 or separate from it.

In various embodiments, aircraft-specific parameters and information for an aircraft may be stored in the memory 16 or in a database 28 and referenced by the program 30. Non-limiting examples of aircraft-specific information includes an aircraft weight and dimensions, performance capabilities, configuration options, and the like.

Flight parameter sensors and geospatial sensors 22 supply various types of data or measurements to the controller circuit 12 during an aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, the display device 14 can include any number and type of image generating devices on which one or more avionic displays 32 may be produced. When the system 10 is utilized for a manned aircraft, the display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the aircraft cockpit by a pilot.

At least one avionic display 32 is generated on the display device 14 during operation of the system 10; the term "avionic display" is synonymous with the term "aircraft-related display" and "cockpit display" and encompasses displays generated in textual, graphical, cartographical, and other formats. The system 10 can generate various types of lateral and vertical avionic displays 32 on which map views and symbology, text annunciations, and other graphics pertaining to flight planning are presented for a pilot to view. The display device 14 is configured to continuously render at least a lateral display showing the aircraft at its current location within the map data. The avionic display 32 generated and controlled by the system 10 can include graphical user interface (GUI) objects and alphanumerical input displays of the type commonly presented on the screens of multifunction control display units (MCDUs), as well as Control Display Units (CDUs) generally. Specifically, embodiments of the avionic displays 32 include one or more two-dimensional (2D) avionic displays, such as a horizontal (i.e., lateral) navigation display or vertical navigation display (i.e., vertical situation display VSD); and/or on one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the display device 14 is a touch screen display. In various embodiments, the human-machine interface also includes a separate pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective functions and provide user feedback, responsive to received user input at the GUI element.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), satellite weather sources, ground stations, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12.

In certain embodiments of the system 10, the controller circuit 12 and the other components of the system 10 may be integrated within or cooperate with any number and type of systems commonly deployed onboard an aircraft including, for example, an FMS 21.

The disclosed algorithm is embodied in a hardware program or software program (e.g. program 30 in controller circuit 12) and configured to operate when the aircraft is in any phase of flight.

In various embodiments, the provided controller circuit 12, and therefore its program 30 may incorporate the programming instructions for: receiving traffic data associated with an intruder aircraft via a common traffic advisory frequency (CTAF), the traffic data including a position of the intruder aircraft; receiving an aircraft position of the aircraft from a geospatial sensor system of the aircraft; determining whether the position of the intruder aircraft is within a pre-defined distance of the non-towered airport; and generating a landing assistance display including a graphical representation of a traffic pattern, the aircraft position of the aircraft, and the position of the intruder aircraft with respect to the traffic pattern for display on a display device onboard the aircraft based on the determination.

Figure 2:
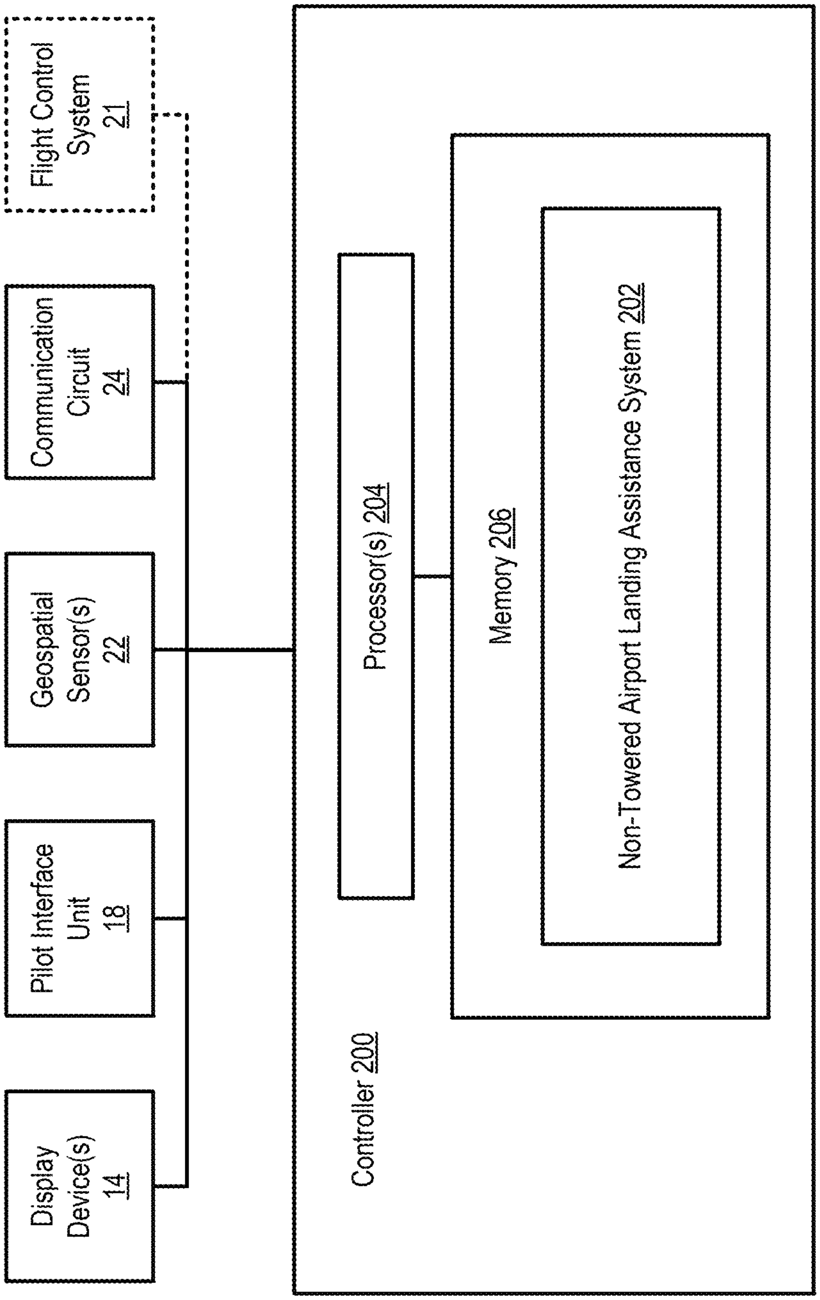
FIG. 2 is a block diagram representation of a controller including a non-towered airport landing assistance system in accordance with at least one embodiment.

Referring to FIG. 2, a block diagram representation of a controller 200 including a non-towered airport landing assistance system 202 in accordance with at least one embodiment is shown. The controller 200 is similar to the controller circuit 12 described with reference to FIG. 1. The controller 200 is configured to be communicatively coupled to a display device 14, a pilot interface unit 18, geospatial sensor(s) 22, and a communication circuit 24 of an aircraft 5. In at least one embodiment, the controller 200 is configured to be communicatively coupled to a flight control system (FCS) 21 of the aircraft 5.

The controller 200 includes at least one processor 204 and at least one memory 206. The memory 206 is similar to the memory 16 described with reference to FIG. 1. The processor(s) 204 is communicatively coupled to the at least one memory 206. The processor(s) 204 is a programable device that includes one or more instructions stored in or associated with the at least one memory 206. The at least one memory 206 includes instructions that the processor(s) 204 is configured to execute. The at least one memory 206 includes the non-towered airport landing assistance system 202. In various embodiments, the controller 200 may include additional components that facilitate operation of the non-towered airport landing assistance system 202. The operation of the non-towered airport landing assistance system 202 will be described in further detail below.

Figure 3:
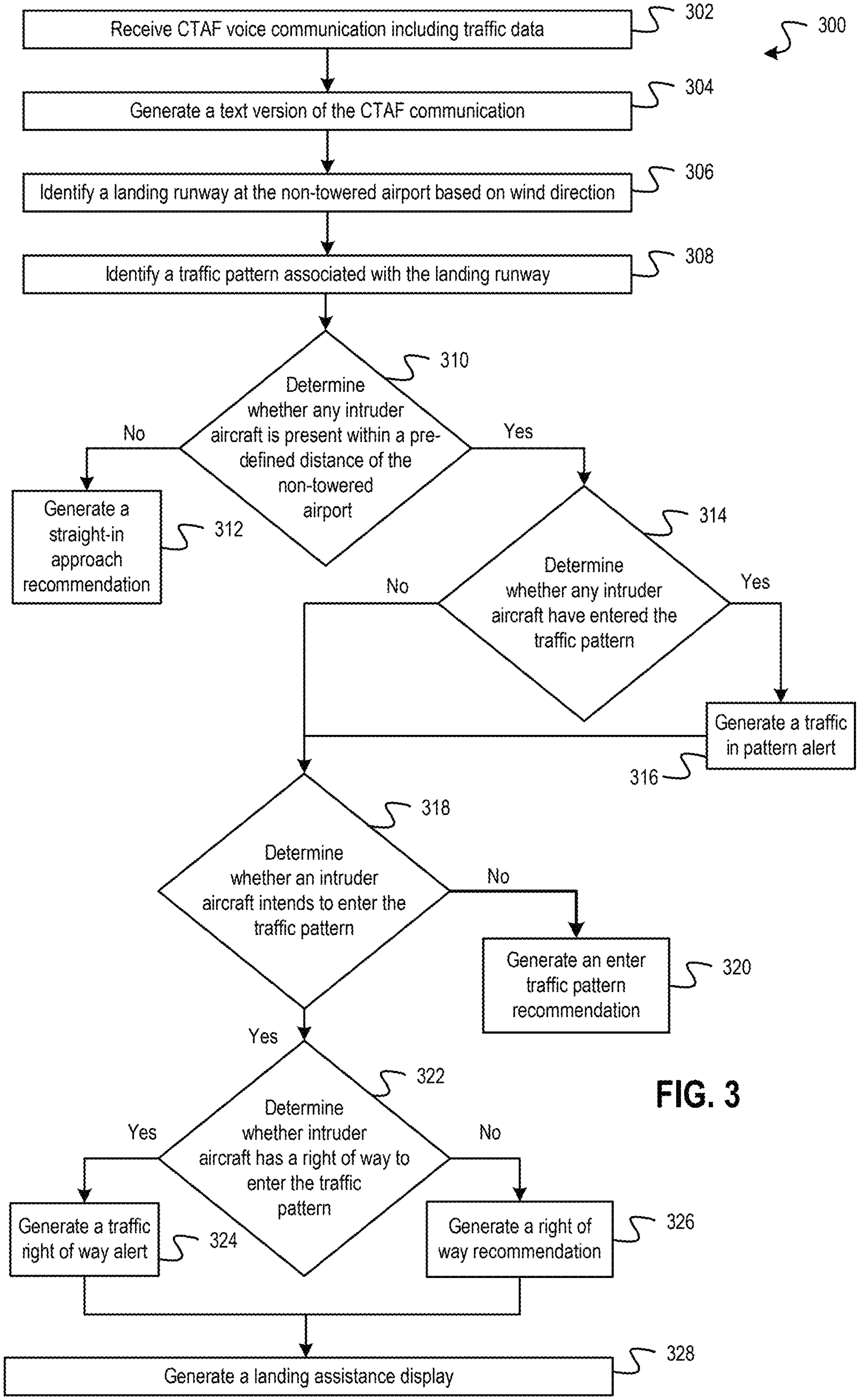
FIG. 3 is a flowchart representation of a method of providing landing assistance at a non-towered airport in accordance with at least one embodiment.

Referring to FIG. 3, a flowchart representation of a method 300 of providing landing assistance at a non-towered airport in accordance with at least one embodiment is shown. The method 300 will be described with reference to an exemplary implementation of a non-towered airport landing assistance system 202. As can be appreciated in light of the disclosure, the order of operation within the method 300 is not limited to the sequential execution as illustrated in FIG. 3 but may be performed in one or more varying orders as applicable and in accordance with the present disclosure.

When an aircraft approaches a non-towered airport for landing, a pilot of that aircraft begins to broadcast traffic data associated with the aircraft on the CTAF. In cases where multiple aircraft are approaching the non-towered airport, the pilot of each of the different aircraft broadcasts traffic data associated with that aircraft on the CTAF. Examples of traffic data include, but are not limited to, an aircraft identifier, an aircraft type, an aircraft position, and an aircraft intention. Examples of aircraft intention include, but are not limited to, an intention to enter a traffic pattern associated with a landing runway at the non-towered airport, an intention to continue flying within the traffic pattern associated with the landing runway, and an intention to fly over the traffic pattern. Aircraft traffic, such as other aircraft approaching the non-towered airport will be referred to as intruder aircraft. In at least one embodiment, a non-towered airport is an airport without an air traffic control (ATC). In at least one embodiment, the non-towered airport is an airport where ATC is closed or unavailable. Pilots operating aircraft in a traffic pattern in non-towered airports have to be alert at all times to other aircraft executing straight in approaches to the landing runway.

At 302, common traffic advisory frequency (CTAF) voice communication including traffic data from one or more intruder aircraft is received at the non-towered airport landing assistance system 202 of the aircraft 5 via the communication circuit 24 of the aircraft 5. The aircraft 5 is the ownship and the non-towered airport landing assistance system 202 is operating onboard the ownship. The CTAF voice communication is received at the communication circuit 24 via CTAF. In at least one embodiment, the traffic data associated with each intruder aircraft includes an aircraft identifier, an aircraft type, an aircraft position, and an aircraft intention. In at least one embodiment, the non-towered airport landing assistance system 202 receives aircraft positions of one or more intruder aircraft via a Traffic Alert and Collision Avoidance System (TCAS).

At 304, a text version of the CTAF voice communication is generated by the non-towered airport landing assistance system 202. In at least one embodiment, the non-towered airport landing assistance system 202 include a voice to text transcription engine. The voice to text transcription engine is configured to receive the CTAF voice communication and generate the text version of the CTAF voice communication.

At 306, a landing runway at the non-towered airport based is identified based on wind direction. A non-towered airport may include a windsock. A windsock provides a pilot with a visual indication of wind direction. In at least one embodiment, the pilot of the aircraft 5 identifies a downwind leg based on the wind direction. The pilot identifies a landing runway at the non-towered airport based on the downwind leg. The downwind leg is parallel to the identified landing runway and has a direction opposite the landing direction on the landing runway. The landing runway is associated with a traffic pattern. The entry point into the traffic pattern is typically at a 45° angle with respect to the downwind leg. The pilot provides the identified landing runway to the non-towered airport landing assistance system 202 via a pilot interface unit 18 of the aircraft 5.

In at least one embodiment, the non-towered airport landing assistance system 202 receives the wind direction from one of a geospatial sensor 22 and an external source of wind direction. The non-towered airport landing assistance system 202 is configured to maintain a list of the landing runways at the non-towered airport and identifies a landing runway from the list of landing runways based on the downwind leg.

At 308, the non-towered airport landing assistance system 202 identifies a traffic pattern associated with the identified landing runway. In at least one embodiment, the non-towered airport landing assistance system 202 is configured to maintain a list of the landing runways at the non-towered airport and the traffic patterns associated with each of the landing runways in the list of landing runways. The non-towered airport landing assistance system 202 is configured to identify the traffic pattern associated with the landing runway selected for landing at the non-towered airport.

At 310, the non-towered airport landing assistance system 202 determines whether any intruder aircraft are present within a pre-defined distance of the non-towered airport. The non-towered airport landing assistance system 202 receives aircraft positions of the aircraft broadcasting on CTAF. In at least one embodiment, the non-towered airport landing assistance system 202 retrieves the aircraft positions from the text version of the CTAF voice communications. In at least one embodiment, the non-towered airport landing assistance system 202 receives the aircraft positions of one or more aircraft via TCAS. The non-towered airport landing assistance system 202 identifies aircraft having aircraft positions within the pre-defined distance of the non-towered airport as intruder aircraft. In at least one embodiment, the pre-defined distance is 10 miles. In many instances, pilots of aircraft begin broadcasting traffic data on CTAF when the aircraft is within 10 miles of a non-towered airport.

If the non-towered airport landing assistance system 202 determines that there are no intruder aircraft present within the pre-defined distance of the non-towered airport, the non-towered airport landing assistance system 202 generates a straight-in approach recommendation for display on a display device 14 of the aircraft 5 at 312. When a pilot guides the aircraft 5 in the straight-in approach to the landing runway, the aircraft 5 does not enter the traffic pattern associated with the landing runway.

If the non-towered airport landing assistance system 202 determines that there are intruder aircraft present within the pre-defined distance of the non-towered airport, the non-towered airport landing assistance system 202 determines whether any of the intruder aircraft have entered the traffic pattern associated with the landing runway at 314.

In at least one embodiment, the non-towered airport landing assistance system 202 uses the aircraft positions of the intruder aircraft to determine whether one or more intruder aircraft have entered the traffic pattern. In at least one embodiment, the non-towered airport landing assistance system 202 uses the aircraft intentions of the intruder aircraft received via the CTAF voice communication to determine whether one or more of the intruder aircraft have entered the traffic pattern. In at least one embodiment, the non-towered airport landing assistance system 202 uses the aircraft positions of the intruder aircraft and the aircraft intention of the intruder aircraft received via the CTAF voice communication to determine whether one or more of the intruder aircraft have entered the traffic pattern. In at least one embodiment, the non-towered airport landing assistance system 202 uses the text version of the CTAF voice communication to identify the aircraft positions of the intruder aircraft and/or the aircraft intentions of the intruder aircraft to determine whether one or more of the intruder aircraft have entered the traffic pattern.

If the non-towered airport landing assistance system 202 determines that at least one intruder aircraft has entered the traffic pattern, the non-towered airport landing assistance system 202 generates a "traffic in pattern" alert for display on the display device 14 of the aircraft 5 at 316. The "traffic in pattern" alert provides the pilot with situational awareness that intruder aircraft is present in the traffic pattern prior to flying the aircraft into the traffic pattern. In at least one embodiment, if the non-towered airport landing assistance system 202 determines that at least one intruder aircraft has entered the traffic pattern, the non-towered airport landing assistance system 202 generates an advisory against a straight-in approach to the landing runway for display on the display device 14 of the aircraft 5. The method 300 proceeds to 318. If the non-towered airport landing assistance system 202 determines that there are no intruder aircraft present in the traffic pattern, the method proceeds to 318.

At 318, the non-towered airport landing assistance system 202 determines whether an intruder aircraft intends to enter the traffic pattern. In at least one embodiment, the non-towered airport landing assistance system 202 uses the aircraft positions of the intruder aircraft to determine whether one or more intruder aircraft intends to enter the traffic pattern. In at least one embodiment, the non-towered airport landing assistance system 202 uses the aircraft intentions of the intruder aircraft received via the CTAF voice communication to determine whether one or more intruder aircraft intends to enter the traffic pattern. In at least one embodiment, the non-towered airport landing assistance system 202 uses the aircraft positions of the intruder aircraft and the aircraft intentions of the intruder aircraft to determine whether one or more intruder aircraft intends to enter traffic pattern. In at least one embodiment, the non-towered airport landing assistance system 202 uses the text version of the CTAF voice communication to identify the aircraft positions of the intruder aircraft and/or the aircraft intentions of the intruder aircraft to determine whether one or more intruder aircraft intends to enter the traffic pattern.

If the non-towered airport landing assistance system 202 determines that none of the intruder aircraft intend to enter the traffic pattern, the non-towered airport landing assistance system 202 generates a enter traffic pattern recommendation for display on the display device 14 of the aircraft 5 at 320. If the non-towered airport landing assistance system 202 determined that there is at least one intruder aircraft present in the traffic pattern, generated the "traffic in pattern alert", determined that none of the intruder aircraft intend to enter the traffic pattern, and generated the enter traffic pattern recommendation, the pilot is provided with guidance to enter the traffic pattern while being cognizant of intruder aircraft being present in the traffic pattern. If the non-towered airport landing assistance system 202 determined that there are no intruder aircraft present in the traffic pattern, determined that none of the intruder aircraft intend to enter the traffic pattern, and generated the enter traffic pattern recommendation, the pilot can enter the traffic pattern without have to worry about the presence of intruder aircraft in the traffic pattern or intruder aircraft intending to enter the traffic pattern.

If the non-towered airport landing assistance system 202 determines that an intruder aircraft intends to enter the traffic pattern, the non-towered airport landing assistance system 202 determines whether the intruder aircraft has the right of way to enter the traffic pattern at 322. In at least one embodiment, the non-towered airport landing assistance system 202 determines whether the intruder aircraft has the right of way based on the aircraft position of the intruder aircraft with respect to the traffic pattern. In at least one embodiment, the non-towered airport landing assistance system 202 determines whether the intruder aircraft has the right of way based on the aircraft type of the intruder aircraft. In at least one embodiment, the non-towered airport landing assistance system 202 determines whether the intruder aircraft has the right of way based on the aircraft position of the intruder aircraft with respect to the traffic pattern and the aircraft type of the intruder aircraft.

If the non-towered airport landing assistance system 202 determines that the intruder aircraft has the right of way to enter the traffic pattern, the non-towered airport landing assistance system 202 generates a "traffic right of way" alert for display on the display device 14 of the aircraft 5 at 324 indicating that the aircraft 5 has to yield to the intruder aircraft when entering the traffic pattern. The method 300 proceeds to 328. If the non-towered airport landing assistance system 202 determines that the aircraft 5 has the right of way to enter the traffic pattern, the non-towered airport landing assistance system 202 generates a right of way recommendation for display on the display device 14 of the aircraft 5 at 326 indicating that the intruder aircraft has to yield to the aircraft 5 when entering the traffic pattern. The method 300 proceeds to 328.

At 328, the non-towered airport landing assistance system 202 generates a landing assistance display for display on the display device 14 of the aircraft 5. In at least one embodiment, the landing assistance display includes a graphical representation of the landing runway, the traffic pattern associated with the landing runway, the position of the aircraft 5, and the positions of intruder aircraft that are within the pre-defined distance of the non-towered airport. In at least one embodiment, an intruder aircraft that has entered the traffic pattern is depicted using a first format and an intruder aircraft that intends to enter the traffic pattern is depicted using a second format. The first format is different from the second format. In at least one embodiment, an intruder aircraft that has the right of way to enter the traffic pattern is depicted using a format that is different from an intruder aircraft that does not have the right of way to enter the traffic pattern. The landing assistance display includes one or more of the straight-in approach recommendation, the "traffic in pattern" alert, the enter traffic pattern recommendation, the "traffic right of way" alert, and a right of way recommendation.

In at least one embodiment, when a pilot of an intruder aircraft is broadcasting traffic data on the CTAF, the graphical depiction of that intruder aircraft is presented in a format on the landing assistance display that indicates that the intruder aircraft is the annunciating aircraft. In at least one embodiment, the aircraft type of each of the intruder aircraft is specified on the landing assistance display. In at least one embodiment, the aircraft intention associated with each of the intruder aircraft is displayed on the landing assistance display.

In at least one embodiment, following entry of the aircraft 5 into the traffic pattern, the non-towered airport landing assistance system 202 tracks the position of the aircraft 5 based on aircraft position data received from the geospatial sensor(s) 22. The non-towered airport landing assistance system 202 determines whether the tracked positions of the aircraft 5 indicate that the aircraft 5 heading away from the traffic pattern. If the non-towered airport landing assistance system 202 determines that the tracked positions of the aircraft 5 indicates that the aircraft 5 heading away from the traffic pattern, the non-towered airport landing assistance system 202 generates a "wrong turn" alert for display on the display device 14 of the aircraft. In at least one embodiment, the "wrong turn" alert is generated for display on the landing assistance display. The "wrong turn" alert warns the pilot that the aircraft 5 is leaving the traffic pattern and heading in a direction away from the traffic pattern. Heading away from the traffic pattern could potentially lead to an adverse aircraft event.

In at least one embodiment, the non-towered airport landing assistance system 202 determines whether a position of an intruder aircraft is within a pre-defined distance of the position of the aircraft 5. If the non-towered airport landing assistance system 202 determines that a position of an intruder aircraft is within the pre-defined distance of the position of the aircraft 5, the non-towered airport landing assistance system 202 generates a prompt to implement an evasive maneuver for display on the display device 14 of the aircraft 5. Upon activation of the prompt via the pilot interface unit 18, a flight control system (FCS) of the aircraft 5 implements the evasive maneuver to avoid a potential adverse event with the intruder aircraft.

Figure 4:
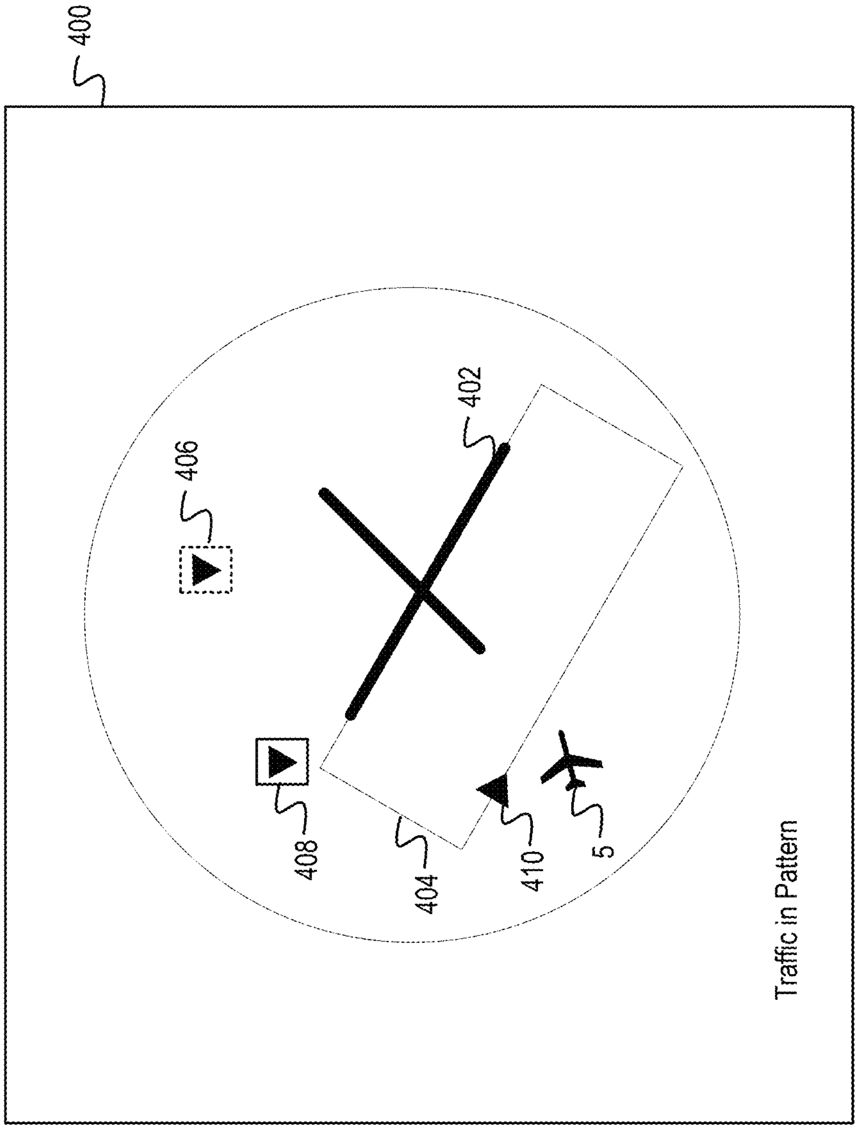
FIG. 4 is an exemplary landing assistance display in accordance with at least one embodiment.

Referring to FIG. 4, an exemplary landing assistance display 400 in accordance with at least one embodiment is shown. The landing assistance display 400 includes a landing runway 402 that has been identified for landing of the aircraft 5 based on wind direction. The non-towered airport landing assistance system 202 of the aircraft 5 has identified a traffic pattern 404 associated with the landing runway 402. The non-towered airport landing assistance system 202 is receiving traffic data in the form of CTAF voice communication from intruder aircraft 406, 408, 410 via CTAF.

The non-towered airport landing assistance system 202 has determined that there are three intruder aircraft 406, 408, 410 disposed within a pre-defined distance of the non-towered airport based on traffic data received from each of the intruder aircraft 406, 408, 410 via CTAF. The non-towered airport landing assistance system 202 has determined that intruder aircraft 410 has entered the traffic pattern 404 and generated a "Traffic in Pattern" alert for display on the landing assistance display 400. The intruder aircraft 410 disposed within the traffic pattern 404 is represented using a specific format that indicates that the intruder aircraft 410 is flying in the traffic pattern 404. The intruder aircraft 406 is currently broadcasting traffic data on CTAF and is represented in a format that indicates that the intruder aircraft 406 is the annunciating aircraft. The intruder aircraft 408 is currently not broadcasting traffic data on CTAF and is represented in a format that indicates that the intruder aircraft 408 is a non-annunciating aircraft. The format used to represent each of the intruder aircraft 406, 408, 410 is in accordance with the status of the intruder aircraft 406. 408, 410 described above.

A non-towered airport landing assistance system 202 onboard an aircraft 5 identifies intruder aircraft within a traffic pattern and correlates the position of the intruder aircraft on the traffic pattern. The non-towered airport landing assistance system 202 provides an advisory alert when intruder aircraft is present within the traffic pattern. The non-towered airport landing assistance system 202 provides right of way guidance when an intruder aircraft is preparing to enter the traffic pattern. The non-towered airport landing assistance system 202 alerts the pilot when engaging in a wrong turn while flying the aircraft 5 in the traffic pattern. The non-towered airport landing assistance system 202 also interprets the intent of intruder aircraft and position of intruder aircraft as reported by the pilot of the intruder aircraft on CTAF and identifies them on the landing assistance display.

The non-towered airport landing assistance system 202 provides a pilot of an aircraft with situational awareness regarding the presence of intruder aircraft within a vicinity of a non-towered airport as well as in the traffic pattern to enable the pilot to execute a safe approach to the landing runway. Use of the non-towered airport landing assistance system 202 reduces pilot workload when operating an aircraft in a non-towered airport especially when multiple intruder aircraft are preparing to land at the non-towered airport using the same landing runway.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like.

The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of providing landing assistance associated with a non-towered airport onboard an aircraft comprising:

receiving first traffic data associated with a first intruder aircraft via a common traffic advisory frequency (CTAF), the first traffic data comprising a first position of the first intruder aircraft;

receiving an aircraft position of the aircraft from a geospatial sensor system of the aircraft;

determining whether the first intruder aircraft has entered a traffic pattern associated with a runway at the non-towered airport based on the first position of the first intruder aircraft received via the CTAF; and generating a landing assistance display comprising graphical representations of the traffic pattern, the aircraft position of the aircraft, and the first position of the first intruder aircraft within the traffic pattern for display on a display device onboard the aircraft based on the determination.

2. The method of claim 1, further comprising based on a determination that the first intruder aircraft has entered the traffic pattern; generating a traffic in pattern alert for display on the display device.

3. The method of claim 1, further comprising:

receiving CTAF voice communication comprising the first traffic data associated with the first intruder aircraft and second traffic data associated with a second intruder aircraft via the CTAF;

generating a text version of the CTAF voice communication comprising the first traffic data and the second traffic data; and identifying the first traffic data in the text version of the CTAF communication including the first traffic data and the second traffic data, the first traffic data comprising the first position of the first intruder aircraft.

4. The method of claim 1, further comprising:

receiving third traffic data associated with a third intruder aircraft via the CTAF, wherein the third traffic data comprises a third position, a third aircraft type, and a third intention of the third intruder aircraft, wherein the third intention is one of an intention to continue flying within the traffic pattern, an intention to enter the traffic pattern, and an intention to fly over the traffic pattern; and generating the third position, the third aircraft type and the third intention of the third intruder aircraft for display on the display device.

5. The method of claim 1, further comprising:

receiving fourth traffic data associated with a fourth intruder aircraft via the CTAF, wherein the fourth traffic data includes an intention of the fourth intruder aircraft to enter the traffic pattern and a fourth position of the fourth intruder aircraft;

determining whether the aircraft or the fourth intruder aircraft has a right of way to enter the traffic pattern based on the aircraft position and the fourth position of the fourth intruder aircraft with respect to the traffic pattern; and generating a right of way alert for display on the display device in accordance with the determined right of way.

6. The method of claim 1, further comprising:
receiving wind direction at the aircraft;
determining a downwind leg based on the wind direction; and
identifying the landing runway at the non-towered airport based on the downwind leg wherein the downwind leg is parallel to the landing runway, a direction opposite a landing direction on the landing runway, and an entry point into the traffic pattern is at a 45° angle with respect to the downwind leg, and the traffic pattern is associated with the landing runway.

7. The method of claim 1, further comprising:
wherein upon a determination that there are no intruder aircraft within a pre-defined distance of the non-towered airport, generating a straight-in approach to the landing runway recommendation for display on the display device; and
upon a determination that the first intruder aircraft is flying within the traffic pattern; and generating an advisory against the straight in approach to the landing runway associated with the traffic pattern.

8. The method of claim 1, further comprising:
following entry of the aircraft into the traffic pattern;
tracking at least one position of the aircraft;
determining whether the at least one position of the aircraft leads away from the traffic pattern; and
generating a wrong turn alert for display on the display device based on the determination.

9. The method of claim 1, further comprising:
determining whether the first position of the first intruder aircraft is within a pre-defined distance of the aircraft position of the aircraft; and
generating a prompt to implement an evasive maneuver for display on the display device based on the determination, wherein upon activation of the prompt, a flight control system (FCS) of the aircraft implements the evasive maneuver.

10. A system for providing landing assistance associated with a non-towered airport onboard an aircraft comprising:
at least one processor; and
at least one memory communicatively coupled to the at least one processor, the at least one memory comprising instructions that, upon execution by the at least one processor, cause the at least one processor to:
receive first traffic data associated with a first intruder aircraft via a common traffic advisory frequency (CTAF), the first traffic data comprising a first position of the first intruder aircraft;
receive an aircraft position of the aircraft from a geospatial sensor system of the aircraft;
determine whether the first intruder aircraft has entered a traffic pattern associated with a runway at the non-towered airport based on the first position of the first intruder aircraft received via the CTAF; and
generate a landing assistance display comprising graphical representations of the traffic pattern, the aircraft position of the aircraft, and the first position of the first intruder aircraft within the traffic pattern for display on a display device onboard the aircraft based on the determination.

11. The system of claim 10, wherein, the at least one memory comprises further instructions that, upon execution by the at least one processor, cause the at least one processor to based on a determination that the first intruder aircraft has entered the traffic pattern, generate a traffic in pattern alert for display on the display device based.

12. The system of claim 10, wherein, the at least one memory comprises further instructions that, upon execution by the at least one processor, cause the at least one processor to:
receive CTAF voice communication comprising the first traffic data associated with the first intruder aircraft and second traffic data associated with a second intruder aircraft via the CTAF;
generate a text version of the CTAF voice communication comprising the first traffic data and the second traffic data; and
identify the first traffic data in the text version of the CTAF communication including the first traffic data and the second traffic data, the first traffic data comprising the first position of the first intruder aircraft.

13. The system of claim 10, wherein the at least one memory comprises further instructions that, upon execution by the at least one processor, cause the at least one processor to:
receive third traffic data associated with a third intruder aircraft via the CTAF, wherein the third traffic data comprises a third position, a third aircraft type, and a third intention of the third intruder aircraft, wherein the third intention is one of an intention to continue flying within the traffic pattern, an intention to enter the traffic pattern, and an intention to fly over the traffic pattern; and
generate the third position, the third aircraft type and the third intention of the third intruder aircraft for display on the display device.

14. The system of claim 10, wherein the at least one memory comprises further instructions that, upon execution by the at least one processor, cause the at least one processor to:
receive fourth traffic data associated with a fourth intruder aircraft via the CTAF, wherein the fourth traffic data includes an intention of the fourth intruder aircraft to enter the traffic pattern and a fourth position of the fourth intruder aircraft; and
determine whether the aircraft or the fourth intruder aircraft has a right of way to enter the traffic pattern based on the aircraft position and the fourth position of the fourth intruder aircraft with respect to the traffic pattern; and
generate a right of way alert for display on the display device in accordance with the determined right of way.

15. The system of claim 10, wherein, the at least one memory comprises further instructions that, upon execution by the at least one processor, cause the at least one processor to:
receive wind direction at the aircraft;
determine a downwind leg based on the wind direction; and
identify the landing runway at the non-towered airport based on the downwind leg wherein the downwind leg is parallel to the landing runway, a direction opposite a landing direction on the landing runway, and an entry point into the traffic pattern is at a 45° angle with respect to the downwind leg, and the traffic pattern is associated with the landing runway.

16. The system of claim 10, wherein, the at least one memory comprises further instructions that, upon execution by the at least one processor, cause the at least one processor to:
upon a determination that there are no intruder aircraft within a pre-defined distance of the non-towered airport, generate a straight-in approach to the landing runway recommendation for display on the display device; and upon a determination that the first intruder aircraft is flying within the traffic pattern generate an advisory against the straight in approach to the landing runway associated with the traffic pattern.

17. The system of claim 10, wherein, the at least one memory comprises further instructions that, upon execution by the at least one processor, cause the at least one processor to following entry of the aircraft into the traffic pattern:

track at least one position of the aircraft;

determine whether the at least one position of the aircraft leads away from the traffic pattern; and generate a wrong turn alert for display on the display device based on the determination.

18. The system of claim 10, wherein, the at least one memory comprises further instructions that, upon execution by the at least one processor, cause the at least one processor to:

determine whether the first position of the first intruder aircraft is within a pre-defined distance of aircraft position of the aircraft; and generate a prompt to implement an evasive maneuver for display on the display device based on the determination, wherein upon activation of the prompt, a flight control system (FCS) of the aircraft implements the evasive maneuver.

19. A non-transitory machine-readable storage medium that stores instructions executable by at least one processor, the instructions configurable to cause the at least one processor to perform operations comprising:

receiving first traffic data associated with a first intruder aircraft via a common traffic advisory frequency (CTAF), the first traffic data comprising a first position of the first intruder aircraft;

receiving an aircraft position of the aircraft from a geospatial sensor system of the aircraft;

determining whether the first intruder aircraft has entered a traffic pattern associated with a runway at the non-towered airport based on the first position of the first intruder aircraft received via the CTAF; and generating a landing assistance display comprising graphical representations of the traffic pattern, the aircraft position of the aircraft, and the first position of the first intruder aircraft within the traffic pattern for display on a display device onboard the aircraft based on the determination.

20. The non-transitory machine-readable storage medium of claim 19, further storing instructions executable by at least one processor, to cause the at least one processor to perform operations comprising based on a determination that the first intruder aircraft has entered the traffic pattern, generating a traffic in pattern alert for display on the display device.

* * * * *